US007140265B2

(12) United States Patent
McGill et al.

(10) Patent No.: US 7,140,265 B2
(45) Date of Patent: Nov. 28, 2006

(54) MINIATURE PARTICLE AND VAPOR COLLECTOR

(75) Inventors: Robert A. McGill, Lorton, VA (US); Jennifer L. Stepnowski, Alexandria, VA (US); Stanley V. Stepnowski, Alexandria, VA (US); Viet Nguyen, Gaithersburg, MD (US); Russell Chung, Oceanside, CA (US); Eric J. Houser, Nokesville, VA (US); Stephen C. Francesconi, Crofton, MD (US); Ronald L. Kelly, Bowie, MD (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 158 days.

(21) Appl. No.: 10/384,925

(22) Filed: Mar. 6, 2003

(65) Prior Publication Data

US 2003/0230152 A1 Dec. 18, 2003

Related U.S. Application Data

(60) Provisional application No. 60/362,537, filed on Mar. 8, 2002.

(51) Int. Cl.
*G01N 1/00* (2006.01)

(52) U.S. Cl. .................................................. 73/863.21

(58) Field of Classification Search ............ 73/863.21, 73/863.22, 863.23, 863.24, 864.71, 864.33, 73/864.34, 864.73, 863.12, 865.5; 435/30, 435/34, 36–38, 31; 96/413

See application file for complete search history.

(56) References Cited

U.S. PATENT DOCUMENTS 3,840,057 A * 10/1974 Lesh, Jr. ...................... 141/67
4,406,581 A * 9/1983 Robb et al. .............. 415/173.5
4,869,236 A * 9/1989 Blough ................... 126/299 R
4,869,822 A * 9/1989 Kamei et al. .......... 210/321.79
5,407,324 A * 4/1995 Starnes et al. ........... 415/208.5
5,421,214 A 6/1995 Burgdorfer
5,593,740 A * 1/1997 Strumban et al. ........... 427/577
5,655,884 A * 8/1997 Rose .......................... 416/240
5,934,869 A * 8/1999 Janisse .................... 415/121.3
6,170,480 B1 * 1/2001 Melink et al. .......... 126/299 R
6,267,016 B1 7/2001 Call et al.
6,335,191 B1 * 1/2002 Kiplinger et al. ........ 435/252.1
6,363,800 B1 4/2002 Call et al.
6,468,330 B1 10/2002 Irving et al.
2001/0029793 A1 10/2001 Moler et al.

FOREIGN PATENT DOCUMENTS

JP 11-29799 * 11/1999

* cited by examiner

*Primary Examiner*—Robert Raevis
(74) *Attorney, Agent, or Firm*—John J. Karasek; Joseph T. Grunkemeyer

(57) ABSTRACT

An apparatus for collecting particles or vapor from air or surfaces comprising: a housing comprising an inlet open to the air to be sampled and an outlet; and a fan having one or more open areas within the housing capable of being driven at a speed effective to cause collection on the surface of the fan of particles or vapor in the air. A method of collecting a particulate sample from air comprising the step of driving a fan having one or more open areas within a housing comprising an inlet open to the air to be sampled and an outlet, at a speed effective to cause collection on the surface of the fan of particles in the air.

36 Claims, 2 Drawing Sheets

18 10 22 14 12 20 16

MINIATURE PARTICLE AND VAPOR COLLECTOR

This application claims priority to U.S. Provisional Patent Application No. 60/362,537, filed on Mar. 8, 2002, incorporated herein by reference.

BACKGROUND OF THE INVENTION

1. Field of the Invention

The invention relates generally to an apparatus for collecting particles and vapor for detection applications.

2. Description of the Prior Art

Biocollectors can be used to collect airborne particles, including biological warfare agents. Such agents in their weaponized state may have particles sizes of only 5+/−4 microns, achieved by milling the biomaterial. Material in this size range can stay airborne for considerable periods and transport over wide areas through airflow. Prior biocollectors for such particles weighed about 10 pounds and required significant power to operate. They required relatively large volumes of processing solutions, and added a large size burden to biodetector technologies, which have the potential to be miniaturized through applications of MEMS and microfluidics. This miniaturization has been stymied by the lack of a miniature bioparticle collector.

Prior particle collectors typically incorporate a relatively high pressure drop across the device to collect the smallest particles. For example, a HEPA filter may collect micron size particles, but a high pressure drop across the filter is required to generate the desired airflow rate. This cannot be generated with miniaturized equipment without expending considerable amounts of power and operating equipment under duress.

Call et at., U.S. Pat. No. 6,267,016 discloses a combined impact collector and fan. The fan is a plate with raised veins. There are no open areas in the plate through which air can flow. All sampled air must flow through a narrow gap between the collector and the house, which results in a high pressure drop.

There is a need for a bioparticle collector that is small and lightweight, consumes little power, and allows for the use of small volumes of solution in processing collected material. Such a collector would be useful in a miniature biodetector.

SUMMARY OF THE INVENTION

The invention comprises an apparatus for collecting particles from air comprising a housing comprising an inlet open to the air to be sampled and an outlet; a fan comprising one or more open areas within the housing capable of being driven at a speed effective to cause collection on the surfaces of the fan of particles in the air having a diameter of about 50 μm or less.

The invention further comprises a method of collecting a particulate sample from air comprising the step of driving a fan comprising one or more open areas within a housing comprising an inlet open to the air to be sampled and an outlet, at a speed effective to cause collection on the surfaces of the fan of particles in the air having a diameter of about 50 μm or less.

DETAILED DESCRIPTION OF THE PREFERRED EMBODIMENTS

Advantages and features of the apparatus may include small size and weight, high airflow, low pressure drop, high collection efficiency, low power consumption, low cost, disposable, simple operation, and maintenance of the integrity of the sample under test.

At a minimum, the apparatus of the invention comprises a housing and a fan. The housing has an inlet that is open to the air to be sampled, and an outlet. The sampled air is suspected of containing particles to be collected. The fan is within the housing. The fan can be driven at a speed effective to cause the particles in the air to be collected on the surface of the fan. The speed may generate airflows of about 50–100 L/min or higher for a single miniature fan. The apparatus can collect particles having a diameter of 50 μm or less, 20 μm or less, or 10 μm or less. Impaction and/or electrostatic interaction between the particles and the surfaces are probable mechanisms that result in particulate collection, though the claims are not limited to such mechanisms.

The fan comprises one or more open areas. One embodiment of such a fan comprises a hub, an annular ring, and a series of axial fan blades connecting the annular ring to the hub. The annular ring may not be necessary. This design allows air to flow through the fan itself. One possible advantage of this design is that there may be a low or negligible pressure drop through the apparatus.

Figure 1:
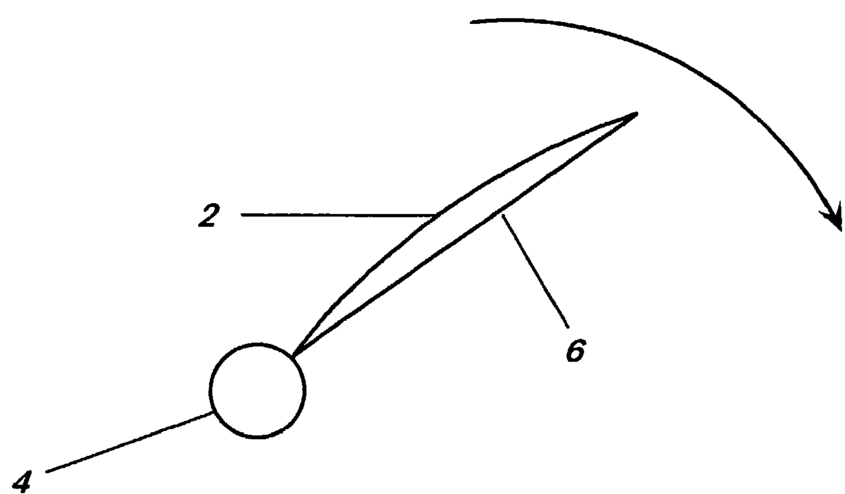
FIG. 1 schematically illustrates where on the fan blades the particles are predominantly collected.

One suitable fan and housing is the commercially available Micronel D244M vane axial fan. This is a vane axial fan that weighs about 15 g. It is normally operated at 6 V, which produces about 13,000 RPM and consumes 0.19 W in its operation. At this speed, the fan will pump air without additional restrictions at 50 L/min and collect a significant percentage of particles, however faster speeds, such as 20,000 RPM, can result in more efficient collection. When operated at about 16 V, the rotational speed is about 26,000 RPM which generates unrestricted airflows of @ 100 L/min. At this high voltage, particles can be collected on the blades of the fan, predominantly on the side of the blades facing away from the direction of motion of the air. This is schematically illustrated in FIG. 1. Only one fan blade 2 is shown attached to an axle 4. The direction of rotation is shown by an arrow. The particles are predominantly collected on the bottom of the blade 6. It is also possible for particles to be collected on the inside surface of the housing. Other suitable fans and housing may together have a mass of no more than 20 g, 100 g, or 200 g.

The fan and other parts of the apparatus may comprise a variety of materials including, but not limited to, a thermoplastic such as polyphenylene oxide. The fan may have a micro- or meso-porous structure so that particles are more likely to be trapped on the fan. The fan material may be chosen to have physicochemical properties that are compatible with particles of interest to be collected.

The fan may also comprise a material that supports the life of a biological material, such as agar or another biocompatible material, so that the material is not denatured. Such a material may include nutrients and stabilizing media such as water and a pH buffer. This may be useful when the particles to be collected may include a biological material such as a biological warfare agent. The biological material may need to be kept alive during detection or other processes, which may occur some time after collection. The fan may also comprise a sponge-like material or polymer with rubbery properties to avoid denaturation of the biological material upon impact with the fan. Such a material may soften the landing as the particles, including bioparticles, collide with the blades of the fan, helping to avoid damaging the particles.

Additional components may be added to the apparatus to increase collection efficiency. For example, two fans may be used in series or in parallel. When in series, particles that are not collected by the first fan in the airflow may be collected by the second fan to increase overall collection efficiency. Another component that may be added is a packed sorbent bed, such as a bead bed. The bead bed may contain sub-millimeter glass beads between two or more meshes. The bead bed may be placed between the inlet and the fan or between the fan and the outlet. When the fan is driven at sufficiently high speed, particles in the air may be collected both on the beads and on the fan.

The apparatus may also comprise means for vibrating an object. The object may be suspected of containing particles that include an analyte of interest such as explosives, narcotics, biological agents, or chemical warfare agents. Vibrating the surface of the object may loosen particles from the surface of object and into the adjacent air so that they can be drawn into the apparatus and collected. Such particles may be about 1–100 μm in diameter. Means for vibrating an object are well known and include, but are not limited to, vibrators used in cellular phones and pagers and ultrasonic vibrators used in dental applications. The vibrating means may be placed in contact with the object either by direct contact of the vibrator or by transmission of the vibrations through other parts of the apparatus.

The apparatus may collect about 60% or more of the particles in the air having a diameter of about 50 μm or less that enter the inlet. This efficiency can be increased by using multiple fans in series. When using two fans in series, the apparatus may collect more than 80% or even more than 99% of the particles. Increased efficiency allows for more sensitive detection of particles.

Collection efficiency is also important when the apparatus is used to purify air. This purification could produce relatively clean breathable air from air that had been contaminated with a biological or chemical warfare agent. The apparatus can be incorporated into a mask for a single person, or into an enclosure for a plurality of people. Multiple fans may be used in parallel in order to process a higher volume of air.

The apparatus may also comprise a vapor collector. As used herein, the term "vapor" includes gas. The vapor collector absorbs vapors so that they may be analyzed. Arson materials and explosives may generate vapors to be collected. An example of a suitable vapor collector is a polytetrafluoroethylene or stainless steel mesh coated with a mixture of a polymer and a carbon material. Polyisobutylene and Darco G-60, 100 mesh activated charcoal is a suitable mixture. This is a general adsorbent that is not very selective. The polymer and charcoal may be mixed together in chloroform, sprayed onto the mesh with an air spray gun, and baked at about 100° C. for about 2 hours to evaporate the chloroform or any other sorbed species that may interfere with later analysis., Charcoal filters, quartz filters, and sorbent polymers are also suitable vapor collectors. The sorbent materials can be coated on the blades of the fan and can also be used in a packed bed design. Vapors may be removed from the vapor collector for analysis by techniques such as thermal desorption and solvent extraction. The vapor collector may have a plurality of zones. Each zone may comprise a different material for absorbing vapors that is selective for particular vapors or classes of vapors. The zones may later be cut or removed from the vapor collector for separate analyses. The zones may be arranged as wedge shapes in a disc shaped vapor collector.

Figure 2:
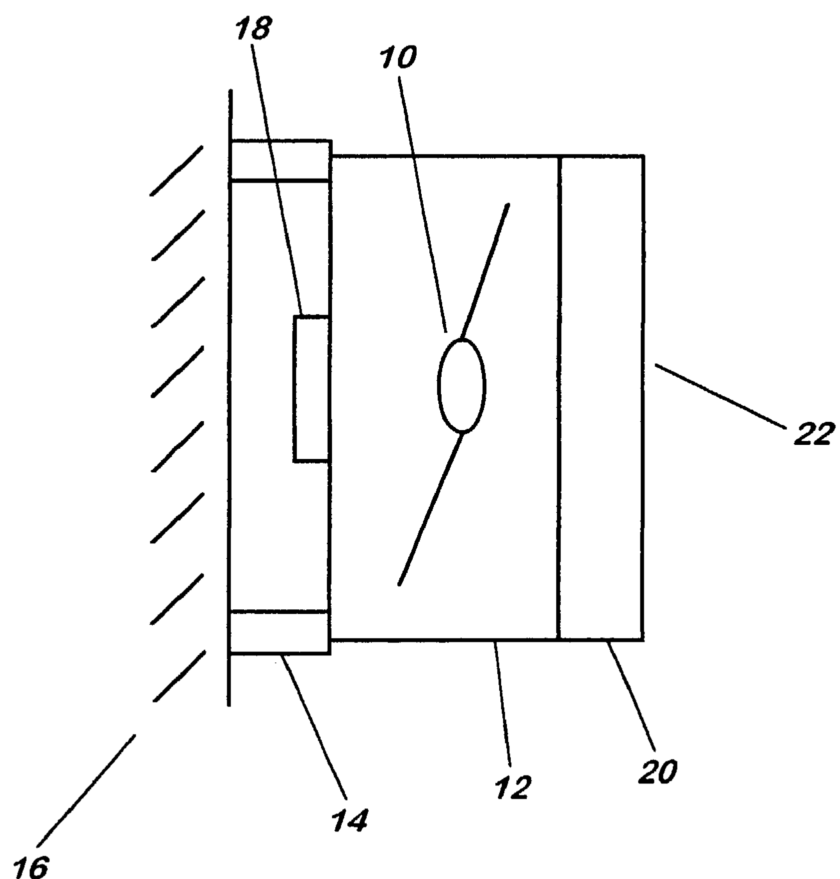
FIG. 2 schematically illustrates an embodiment of an apparatus for practicing the invention using a vibrator and a vapor collector.

FIG. 2 schematically illustrates an embodiment of the apparatus with a vibrator and a vapor collector. The fan 10 is inside the housing 12. The housing has an extension 14 to contact an object 16. The extension 14 has holes to allow air to enter the housing 12. A vibrator 18 causes the object 16 to vibrate. Particles leave the surface of the object 16, enter the inlet of the housing 12, and are collected on the fan 10. Vapors pass through the housing 12 and into the vapor collector 20. Air then exits the apparatus from the outlet 22.

The apparatus may also comprise air collection means for increasing the amount of air that enters the apparatus. The air collection means may be a cone shaped nozzle connected to the inlet. The smaller end of the cone is attached to the inlet.

The apparatus may also comprise means for in situ vaporizing the collected particles as they are collected. This may be done by heating the apparatus, or just the fan. The heating may be done by a meander wire resistor incorporated into the surfaces where the particles are collected. External heating from an infrared lamp or other heating source can also be used. The incoming air could pass over a heating coil in order to vaporize the particles as they enter the apparatus. Particles may also be evaporated directly from an object under test by applying heat to the object. The vapor may then be collected for later analysis to identify the particles in the manner described above. This may be useful for detection of explosives, narcotics, and chemical warfare agents. Chemical warfare agents may be impregnated into dust or other sorbent particles. The evaporation may evaporate the chemical agent so that it may be analyzed, while the dust or supporting particles remain on the fan.

Particles may be evaporated in fractions by using a thermal ramp. This may be done to isolate particles of interest. A laser may also be used to evaporate the particles. The laser can raster across the fan blades to evaporate particles from the entire fan. The laser may be at a frequency that is selective to evaporate particles of specific materials of interest.

The apparatus may also comprise a filter for collecting particles having a diameter larger than about 50 μm. Such filters are well known in the art. The filter for additional purification, or when it is desired to analyze both the smaller and larger particles.

The apparatus may also comprise means for maintaining a constant flow rate of air through the apparatus. One way to do this is with pulse width modulation in conjunction with a hot wire anemometer. The anemometer measures the flow rate. Electronics are used to determine whether the flow rate should be adjusted. The electronics can switch the fan on and off quickly and repeatedly in order to control the flow rate. The switching rate can be increased or decreased to maintain the constant flow rate. This technique may be useful when conducting analytical measurements of the concentration of particles in the sampled air. It may be desirable to sample a constant volume of air.

The apparatus may weigh as little as 1–4 oz and be small enough to be inconspicuous, such as the size of a matchbox or cigarette lighter. This compares favorably to previous biocollectors that could weigh 160 oz and be the size of a shoebox or larger. The fan may be powered by batteries such as AAA batteries and controlled by simple electronics. The electronics may include a DC—DC converter to control the voltage supplied to the fan and a microcontroller to add timing and variable flow functions with the application of pulse width modulation operating schemes. The apparatus may be incorporated into a detector or used as a stand-alone device for forensics detection. The apparatus may be made inexpensively enough to be considered disposable. The apparatus could be kept in a sealed laminated bag or a metal can until it is used, and after particles and vapors collected, the apparatus would be re-sealed until analysis. The apparatus may be useful for collecting particles and/or vapors from arson materials including gasoline, diesel fuel, kerosene, alcohol, ethanol, lighter fluid, turpentine, coal, candles, cigarettes, matchbooks, and nitro methane; explosives including RDX, TNT, NG, HMX, TETRYL, ammonium nitrate, urea nitrate, EGDN, TATP, C4, Semtex, and PETN; gun shot residues including lead, barium, antimony, and soot; biological agents including Anthrax (*Bacillus anthracis*), Botulism Toxin (*Clostridium botulinum* toxin), Plague (*Yersinia pestic*), Small pox (avriola major), Tularemia (*Francisella tularensis*), Ebola fever (filoviruses), Marburg (hemorrhagic fever), Brucellosis (*Brucella melitensis*), Cholera (*Vibrio cholera*), Clostridium Perfringens (clostridial myonecrosis), Congo-Crimean (*Hemorrhagic Fever*), Meliodosis (*Pseudomonas pseudomallei*), Q Fever (*Coxiella burnetii*), Rican, Rift Valley Fever, Saxitoxin, Staphyloccal Enterotixon (*Staphylococcus aureus*), Trichothecene Mycotoxins and Venezuelan Equine Encephalitis, small pox, yellow fever, *Salmonella*, Ebola virus; and narcotics including cocaine, heroin, and marijuana; and chemical agents including GA (Tabun), GB (Sarin), GD (Soman), GF and VX (Methylphoshonothioic Acid)], Blister Agents [HD—Sulphur Mustards (Yperite), HN—Nitrogen Mustard, L—Lewisite, CX—Phosgene Oximine] and Choking Agents [CG Phosgene, DP Diphosgene, Cl Chlorine, PS Chloropicrin] CK, AC, and toxic industrial chemicals.

The particles may be removed from the fan and other parts of the apparatus and analyzed. The removing may be done by rinsing the particles from the fan, housing, and/or packed sorbent bed. The rinsing liquid may be tested for compatibility with the fan and other components to ensure that the fan is not dissolved into the liquid during the rinsing process. Methanol is a suitable solvent when using a polyphenylene oxide fan with collected particles of explosives. The rinsing may use as little as about 1 mL of liquid or less while removing at least about 90% of the collected particles or until the liquid is saturated with the particles. The rinsing may be done by pouring the liquid over the fan. The rinsing may also be done by spinning the fan in the liquid. The spinning may be done in a very small amount of liquid due to the liquid wicking on the fan blades. The solution or suspension of material may be centrifuged to separate material of interest. This separated material can be retaken up in a smaller volume of liquid for analysis or further processing. The liquid may be analyzed by analytical techniques such as GC-MS, HPLC, and PCR (polymerase chain reaction).

Once the particles have been collected and removed, they can be analyzed to detect the presence of the material of interest. Vapors absorbed in the vapor collector can also be analyzed. This may be done at a later time, or in situ with the collection process. Detection may be improved by allowing the fan to collect particles and vapor over an extended period before the analysis. This allows the particles to be more concentrated on the fan and the vapors to be more concentrated in the vapor collector than in the sampled air. These concentrated particles can then be removed all at once to maintain them in a small volume of highly concentrated material.

Having described the invention, the following examples are given to illustrate specific applications of the invention. These specific examples are not intended to limit the scope of the invention described in this application.

COMPARATIVE EXAMPLE

Figure 3:
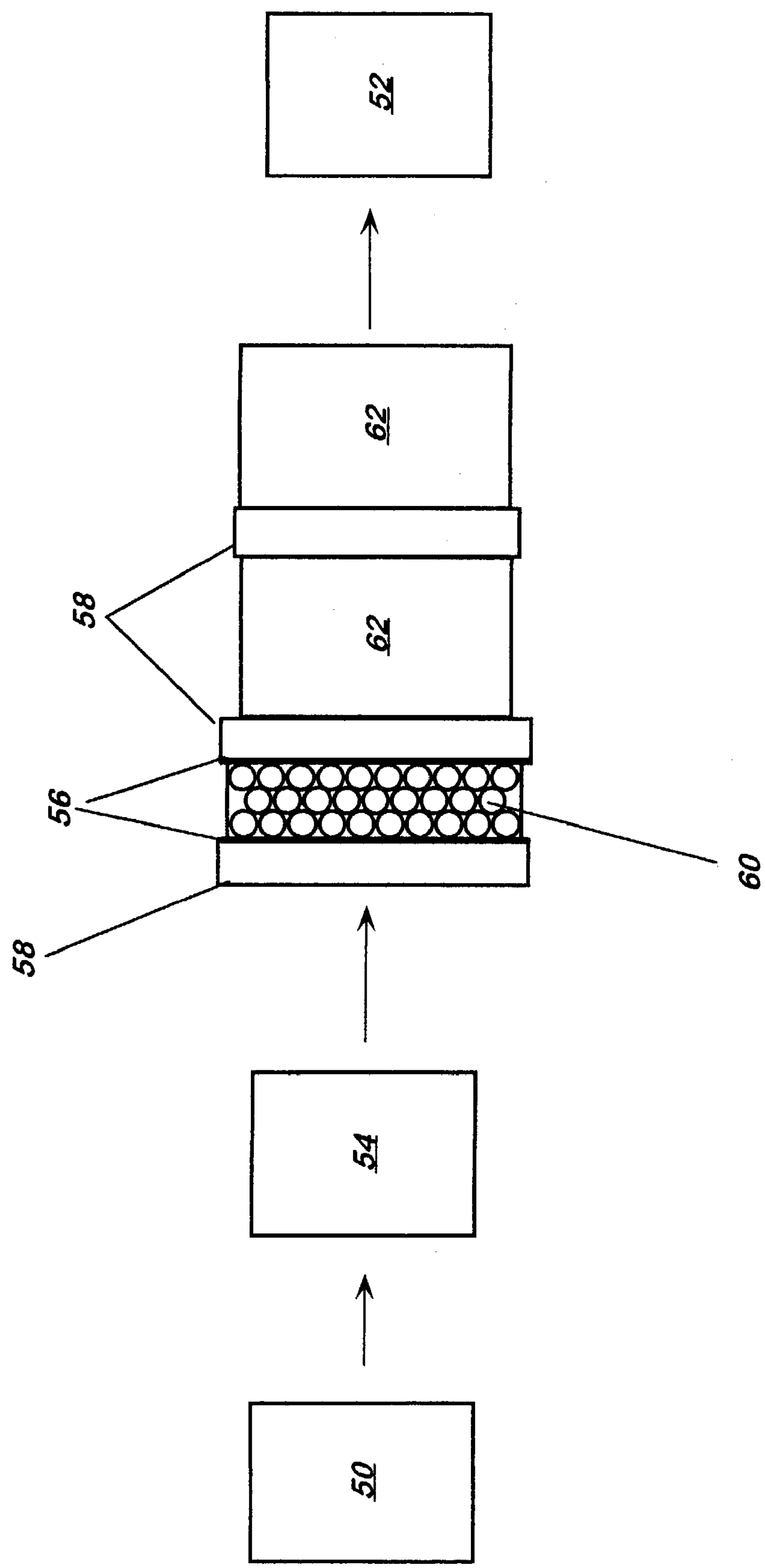
FIG. 3 schematically illustrates an embodiment of an apparatus for practicing the invention using two fans and a bead bed.

Particle collector with no fan or fan turned off—FIG. 3 schematically illustrates an apparatus used in the Comparative Example and Examples 1 and 2. The results are summarized in Table 1. The apparatus has a 2 μm fluorescent polystyrene bead aerosol generator 50 and a particle counter 52. Initially a baseline reading or particle count was taken in the presence of only these two components. The baseline was 1000 particles/min. A flow meter 54 was than placed between the bead generator and the particle counter. The reading remained 1000 particles/min. A pair of 380 mm metal mesh screens 56 in a polytetrafluoroethylene mount 58 was then placed between the flow meter and the particle counter. The spacing between the screens was variable. Again, the reading remained at 1000 particles/min.

The space between the screens was then filled with 500 μm glass beads 60. A pair of Micronel D244M fans 62 was placed adjacent to the screens, between the screens and the particle counter, with another mount between the fans. The fans were turned off. When the bed depth was 1/16", the reading was still 1000 particles/min, showing that no particles were measurably collected on the beads or the fans. When the bead depth was increased to ¼" the reading was 700 particles/min. When the bed depth was increased to ½" the reading was 60 particles/min, and efficiency of 94%.

The process was repeated with the fans off and without the beads or flow meter, but with the screens. The reading was 850 particles/min or 15% collection efficiency.

Example 1

Fan operated at normal speed—In these tests, the fans were operated at their normal operating voltage of 6.0 V. The flow of air through the apparatus was actively monitored with a hot wire anemometer technique and with an active feedback control. The control of the fans was operated in a pulsed width modulation fashion so that the fans were turned on and off with different ratios of on and off times to allow the flow rate to be kept constant during a variety of operational conditions and during extended use where fan flow performance under constant driving conditions would ordinarily lead to a reduction in flow. Three tests were done without any beads, but with the screens. In one, the flow meter was removed which resulted in 80% collection efficiency. When the flow meter was returned, the efficiency remained 80%. The particle counter was then separated from the fans, leaving a 5 mm air gap. This reduced efficiency to 70%.

When a 1/16" depth bead bed was used (with the flow meter and without the gap) the efficiency increased to 82.5%.

Example 2

Fan operated at high speed—In these tests, the fans were operated at 15.7 V. When the test was run without screens but with the flow meter, the efficiency was 99–99.5%. When the screens were replaced and the flow meter removed, the efficiency was 99%. With both screens and flow meter, the efficiency was still 99%. The particle counter was then separated from the fans, leaving a 5 mm gap. This reduced efficiency to 98%.

A 1/16" bead bed was then added to the apparatus with the screens, flow meter, and gap. The efficiency was improved to 99%.

TABLE 1

| flow meter used? | support screens used? | sorbent bead bed | Fans used or operating voltage | Air gap between fan outlet and particle counter? | collection efficiency |
|---|---|---|---|---|---|
| no | no | no | none | no | 0% |
| yes | no | no | none | no | 0% |
| yes | yes | no | none | no | 0% |
| no | yes | no | off | no | 15% |
| yes | yes | 1/16" | off | no | 0% |
| yes | yes | 1/4" | off | no | 30% |
| yes | yes | 1/2" | off | no | 94% |
| no | yes | no | 6.0 V | no | 80% |
| yes | yes | no | 6.0 V | no | 80% |
| yes | yes | no | 6.0 V | yes | 70% |
| yes | yes | 1/16" | 6.0 V | no | 82.5% |
| yes | no | no | 15.7 V | no | 99–99.5% |
| no | yes | no | 15.7 V | no | 99% |
| yes | yes | no | 15.7 V | no | 99% |
| yes | yes | no | 15.7 V | yes | 98% |
| yes | yes | 1/16" | 15.7 V | yes | 99% |

Example 3

Washing of fan—A single fan was run at 15.7 V for one hour and exposed to over 1500 particles/min of 2 μm fluorescent polystyrene beads. No bead bed was used. These beads fluoresce when exposed to 365 nm UV light. When exposed to UV light, green fluorescence on the fan was visible to the naked eye. The fluorescence was particularly strong on the underside of each blade, as shown in FIG. 1. Comparatively little fluorescence was observed on the housing.

10 mL of water was pipetted onto the back of the fan blades and the wash water was collected in a glass vial. After this rinse, the fan showed significantly less fluorescence, and the rinse water showed visible fluorescence. The fan was then spin washed by submerging in 5 mL water and run at 30 V for one minute. The spin washing was repeated with a fresh 5 mL of water. The spin washing reduced the fluorescence of the fan and housing to the point that is was barely visible. It was estimated that a total of 90–99% of the collected particles were removed from the fan and housing and retained the water. This was also achieved by spinning the fan in 200–500 μL of water.

Example 4

Wind tunnel testing with $Al_2O_3$—The fans and screens were placed in a wind tunnel to simulate the collection of particles by a flying aircraft or any other mobile vehicle. The wind speed was 35 Knots, and the temperature was 50° F. The relative humidity was varied. $Al_2O_3$ was fed into a small chamber and converted into an aerosol, which was then directed and fired at ultrasonic speeds into a buffer box to remove large particles. Flow from the buffer box was then diluted by external ambient air and fed into the wind tunnel. The particles had a mean diameter of 2 μm, and a mean concentration of 150 particles/$cm^3$. The tests were run for 5–6 minutes in three different modes: two fans, two fans with screens and 1/8" plain glass bead bed, and two fans with screens and 1/8" Verigel glass bead bed. The fan was driven at 28 V. After each test, the white $Al_2O_3$ was clearly visible on the black fan blades. The particles were removed on a vibrating stage for 2 minutes in 5 mL of isotone II, a solution of salts similar to PBS.

Example 5

BG spore collection—The apparatus of Examples 1 and 2 was used to collect *Bacillus globigii* (BG) spores instead of polystyrene particles. The spores were BG γ irradiated (93PB A-1) with a spore size distribution of 0.7–1.0 μm. No screens or bead beds were used. Two fans in electrical series were used and the operating voltage varied from 0 to 28 V. As shown in Table 2, collection efficiency increased as the voltage and fan speed was increased.

TABLE 2

| Voltage | Collection Efficiency |
|---|---|
| 0 | 0% |
| 5 | 40% |
| 10 | 65% |
| 12 | 65% |
| 15 | 75–77.5% |
| 20 | 75–77.5% |
| 25 | 80% |
| 28 | 80–85% |
| 28* | 87.5% |

*Fans only (3, 4)-10 minutes

Example 6

Collection of 2,4-Dinitrotoluene (2,4-DNT) Particles (Simulant for TNT Explosive)—A solution of 2,4-DNT particles was prepared by adding 0.1327 g of 2,4-DNT particles (less than 300 microns in size) to 100 mL of filtered n-hexane. The solution was aerosolized and a baseline particle count was measured. The particle collector (Vane axial fan Micronel D371L [normal operating voltage 15V]) was then placed between the aerosol generator and particle counter. Various voltages were applied to the fan while the particle count was monitored.

TABLE 3

Collection efficiency for 2,4-DNT particles at Different Voltages

| Applied Voltage to D371L Fan | % Collection Efficiency 2–5 μm sized particles of 2,4-DNT* |
|---|---|
| 15.1 | 34 |
| 20.5 | 64 |
| 27.5 | 68 |

*((Particulate count with no fan - Particulate count with fan)/Particulate count with no fan) × 100 = % collection efficiency Similar to the results for polystyrene particles, an increase in voltage demonstrated an increase in particle collection efficiency. Additionally, the gain in efficiency is minimal at the highest tested voltage.

Example 7

Collection of vapor—For experiments with configuration C of the collector (see below), approximately two grams of activated carbon (Darco, 20–40 mesh, Aldrich Chemical Co.) was packed into a holder that friction fits to the outlet of the particle collector (axial fan). The carbon was held in place by two 380 micron stainless steel screens. Initially, the particle/vapor collector was exposed to clean air to condition the carbon and equilibrate it with the air stream. The fan was operated at 15.1 V (manufacturer recommended operating voltage). The vapor collector was weighed after this conditioning. Then, the fan was exposed to a 1% ethanol/air stream generated by diluting a nitrogen stream saturated with ethanol vapor (400 mL/min) with 40 L/min of filtered air. The exposure was timed and the vapor collector was weighed after removal from the vapor generator.

The vapor collector was conditioned for 10 minutes then exposed to 1% ethanol headspace vapor for ten minutes. This resulted in a measurable mass increase detailed in Table 4.

TABLE 4

Summary of Gravimetric Analysis for Ethanol Vapor Collection on Activated Carbon Bed (Collector Configuration C)

| Sample | Conditioned Mass (g) | Time of Exposure to Ethanol (minutes) | Mass After Exposure (g) | ΔMass (g) |
|---|---|---|---|---|
| 1 | 17.8776 | 10.0 | 17.8008 | 0.0491 |

Fan particulate and packed bed vapor combination collector Configuration C: The fan collector module consisted of an axial fan, filter housing, and a shallow bed packed with activated carbon and retained with 2 stainless steel membranes. The main purpose of the packed carbon bed was to collect vapors and particles that passed through the fan. The axial fan (blade and housing) made of polyphenylene oxide (Noryl) from Micronel Company. The fan can produce a flow-rate of up to 4 cfm (free flow) when operated at 15V. The dimension of the fan was 1.45×1.45×1.8 inch. The carbon vapor filter housing was made from polyphenylene oxide and was friction fit to the fan housing. The dimension of the filter housing was 1.6" O.D. and 0.5" in length. After use, arson vapors collected on the packed carbon bed were analyzed by solvent extraction or by thermally heating the carbon bed to release the vapors. The activated carbon was relatively easy to remove from the collector and could be poured into a vessel used for solvent extraction or solid phase micro extraction (SPME).

Example 8

Measurement of pressure drop—The pressure drop across the apparatus was measured using a number of configurations and voltages. The fan was the Micronel D371L, which has a mass of 36 g. The fan was in series with a flow meter and, in some cases, with porous screens or an activated carbon bed. The flow measuring device added its own pressure drop so the flow rates measured were not as high as the flow rates that were achieved without the flow meter connected. The measured flow rate was adjusted to estimate the true flow rate that is achieved without the flow meter attached to the fan.

TABLE 5

Fan Flow & Pressure Drop Characteristics

| Applied voltage (V) | Experiment configuration | Flow rate (L/min) (adjusted for flow meter restriction) | Flow rate (L/min) (not adjusted for flow meter restriction) | Pressure drop across fan inlet/outlet $Nm^{-2}$ | Power (W) |
|---|---|---|---|---|---|
| 15 | Fan Only + Flow Meter | 300 | 42 | <1 | 1 |
| 20 | Fan Only + Flow Meter | 400 | 56 | | 1.4 |
| 27.5 | Fan Only + Flow Meter | 521 | 73 | | 2 |
| 15 | Fan + Porous Screens + Flow Meter | 257 | 36 | 40 | |
| 20 | Fan + Porous Screens + Flow Meter | 350 | 49 | | |
| 27.5 | Fan + Porous Screens + Flow Meter | 421 | 59 | | |
| 15 | Fan + Porous Screens + Activated Carbon bed + Flow Meter | 107 | 15 | 120 | |

Obviously, many modifications and variations of the present invention are possible in light of the above teachings. It is therefore to be understood that the invention may be practiced otherwise than as specifically described.

We claim:

1. An apparatus for collecting particles from air comprising:

a housing comprising an inlet open to the air to be sampled and an outlet;

a fan within the housing capable of being driven at a speed effective to cause collection on the surfaces of the fan of a portion of the particles in the air having a diameter of about 50 μm or less;

wherein the fan comprises a hub and a plurality of axial fan blades connected to the hub at an end of each axial fan blade; and a packed sorbent bed between the inlet and the fan or between the fan and the outlet.

2. The apparatus of claim 1, wherein the fan is capable of being driven at a rotational speed of at least about 20,000 RPM.

3. The apparatus of claim 1, wherein the airflow rate is at least about 50 L/min.

4. The apparatus of claim 1, wherein the housing and fan together have a mass of no more than about 200 g.

5. The apparatus of claim 1, wherein the apparatus collects at least about 60% of the particles in the air having a diameter of about 50 μm or less that enter the inlet.

6. The apparatus of claim 1, wherein the apparatus collects particles by means of electrostatic attraction.

7. The apparatus of claim 1, wherein the particles are further collected on the inside surface of the housing.

8. The apparatus of claim 1, wherein the apparatus comprises more than one fan.

9. The apparatus of claim 1, further comprising vibrating means;

wherein the vibrating means can be placed in contact with an object to loosen particles from the object and into the air.

10. The apparatus of claim 1, further comprising air collection means connected to the inlet.

11. The apparatus of claim 1, wherein the particles comprise a biological material.

12. The apparatus of claim 11, wherein a surface of the fan comprises a material that supports the life of the biological material.

13. The apparatus of claim 11, wherein a surface of the fan comprises a material that avoids denaturing of the biological material upon impact with the fan.

14. The apparatus of claim 1, wherein the particles comprise one or more materials selected from the group consisting of an explosive, a chemical warfare agent impregnated support, and a narcotic.

15. The apparatus of claim 1, further comprising means for vaporizing the collected particles as the particles are collected.

16. The apparatus of claim 15, wherein the vaporizing means vaporize materials impregnated into the particles.

17. The apparatus of claim 1, further comprising a vapor collector between the fan and the outlet.

18. The apparatus of claim 17, wherein the vapor collector has a plurality of zones that collect a plurality of different vapors.

19. The apparatus of claim 1, further comprising means for maintaining a constant flow rate of air through the apparatus.

20. A sensor comprising the apparatus of claim 1.

21. A method of collecting a particulate sample From air comprising the step of driving a fan within a housing comprising an inlet open to the air to be sampled and an outlet, at a speed effective to cause collection on the surfaces of the fan of particles in the air having a diameter of about 50 μm or less;

wherein the fan comprises a hub and a plurality of axial fan blades connected to the hub at an end of each axial fan blade; and wherein the particles are collected in a packed sorbent bed.

22. The method of claim 21, wherein the fan is driven at a rotational speed of at least about 20,000 RPM.

23. The method of claim 21, wherein the method collects at least about 60% of the particles in the air having a diameter of about 50 μm or less that enter the inlet.

24. The method of claim 21, wherein the method collects particles by means of electrostatic attraction.

25. The method of claim 21, wherein the particles are collected on the inside surface of the housing.

26. The method of claim 21, further comprising the step of removing the particles from the fan.

27. The method of claim 26, wherein the removing step comprises rinsing the fan with a liquid that removes the particles.

28. The method of claim 26, further comprising the step of analyzing the removed particles.

29. The method of claim 21, further comprising the step of vaporizing the collected particles.

30. The method of claim 21, further comprising the step of vibrating an object to loosen particles from the object and into the air.

31. The method of claim 21, wherein the particles comprise one or more materials selected from the group consisting of a biological material, an explosive, a chemical warfare agent, and a narcotic.

32. The method of claim 21, further comprising the step of collecting vapor from the air that enters the inlet in a vapor collector.

33. The method of claim 21, further comprising the step of collecting particles having a diameter of about 50 μm or more in a filter.

34. The method of claim 21, wherein the flow of air through the fan is maintained at a constant flow rate.

35. The apparatus of claim 1, wherein the fan further comprises an annular ring connected to the axial fan blades.

36. The method of claim 21, wherein the fan further comprises an annular ring connected to the axial fan blades.

* * * * *